US005706681A

United States Patent [19]
Gorokhovsky

[11] Patent Number: 5,706,681
[45] Date of Patent: Jan. 13, 1998

[54] ANTITHEFT LOCKING DEVICE FOR A VEHICLE

[76] Inventor: Mark Gorokhovsky, 490 - 33rd Ave. #206, San Francisco, Calif. 94121

[21] Appl. No.: 519,715

[22] Filed: Aug. 28, 1995

[51] Int. Cl.⁶ .................................................. B60R 25/02
[52] U.S. Cl. .................. 70/209; 70/226; 70/427; 70/455; 70/454
[58] Field of Search ............... 70/209, 211, 212, 70/225, 226, 237, 238, 423, 427, 453, 454, 455

[56] References Cited

U.S. PATENT DOCUMENTS

| 1,088,917 | 3/1914 | Meledonian | 70/455 |
|---|---|---|---|
| 1,741,093 | 12/1929 | Briggs | 70/455 |
| 2,491,337 | 12/1949 | Segal | 70/455 |
| 4,104,898 | 8/1978 | Fois | 70/454 |
| 4,638,652 | 1/1987 | Morse et al. | 70/455 |
| 4,848,110 | 7/1989 | Kuo | 70/238 |
| 5,097,685 | 3/1992 | Lien | 70/238 |
| 5,275,030 | 1/1994 | Cole | 70/209 |
| 5,329,793 | 7/1994 | Chen | 70/209 |
| 5,353,614 | 10/1994 | Anderson | 70/209 |
| 5,415,018 | 5/1995 | Ferrante | 70/209 |
| 5,426,960 | 6/1995 | Jan | 70/226 |
| 5,440,908 | 8/1995 | Lin | 70/211 |
| 5,454,240 | 10/1995 | Whitney | 70/209 |
| 5,454,242 | 10/1995 | Su | 70/211 |
| 5,471,855 | 12/1995 | Wu | 70/209 |
| 5,540,067 | 7/1996 | Kim | 70/209 |

FOREIGN PATENT DOCUMENTS

| 2487275 | 7/1980 | France. | |
|---|---|---|---|
| 652858 | 2/1963 | Italy | 70/237 |

*Primary Examiner*—Darnell M. Boucher
*Attorney, Agent, or Firm*—Ilya Zborovsky

[57] ABSTRACT

An antitheft locking device has a steering wheel engaging member (30) with an end wall (32) covering the steering wheel (12) over its part that includes at least two ribs (16, 18), a peripheral wall (33) extending over at least a part of the outer periphery of a rim (14) of the steering wheel, and two spaced stops (34) protruding from end wall (32) and engageable with the ribs. A stop member (24) attached to steering wheel engaging member (30) extends at an angle with respect to its end wall (32) and is engageable with a fixed part (26) of a vehicle. A locking mechanism has a lock (60) made fast to steering wheel engaging member (30) and a locking member (72) connected to the steering wheel engaging member for movement to a locked position in which locking member (72) and steering wheel engaging member (30) fully enclose rim (14) of steering wheel (12).

10 Claims, 7 Drawing Sheets

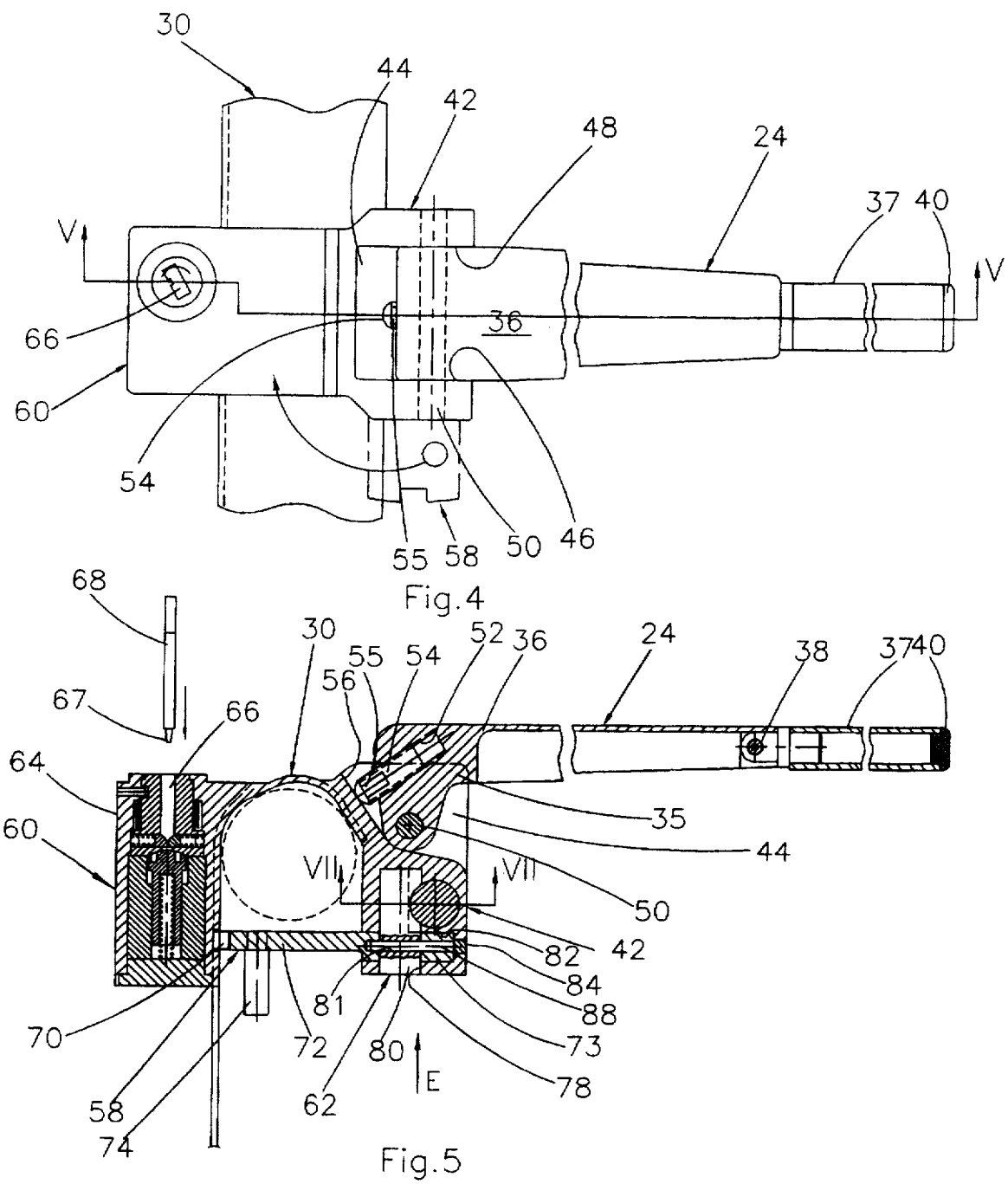

ANTITHEFT LOCKING DEVICE FOR A VEHICLE

FIELD OF THE INVENTION

The invention relates to devices for preventing unauthorized use of vehicles, and more particularly, the invention deals with an antitheft locking device of the type that is to be installed on a steering wheel and locked to make a vehicle non-drivable by unauthorized persons.

BACKGROUND OF THE INVENTION

Prior art teaches a steering lock in the form of a hooking device that has a pair of hooks to hook the steering wheel and an extensible solid bar member long enough in length to prevent the steering wheel from being turned. The solid bar is engageable with a fixed part of the vehicle such a door, seat or the floor. The antitheft device has a lock with a keyhole facing toward the driver seat.

The main disadvantage of the device of such type is the possibility of removing its hooks from the steering wheel by cutting through the steering wheel rim by means of a bolt cutter or hacksaw. This is because the prior art antitheft device is attached to the steering wheel at two spaced points only, leaving the rim exposed. In addition, as the keyhole of the lock of the above antitheft device faces towards the driver seat it is easy for a potential thief to tamper with the lock.

An attempt to improve the above-described device by providing a cap with a pair of slots that has to be out on top the steering wheel cannot make this device any better. As the hooks of the locking bar are inserted to the slots to engage the steering wheel, there is a clearance between the hooks and the slots. A hack saw can be inserted into the clearance for cutting the rim of the steering wheel, and the slots can be used as guides for the hack saw. The cap can be moved radially with respect to the steering wheel thus allowing the wheel rim to be cut through the cap slots.

It is not easy to install the device because the bar with hooks has to be first aligned with the steering wheel to mark its position. The cap has then to be put on the steering wheel in the marked position, and the hooks of the locking bar have to be inserted through the cap slots to engages the rim. Only after that the lock can be locked. The device has to be stored as in two separate pieces.

Although the above-mentioned antitheft devices have been extensively used for about a decade owing to their advantages over other known antitheft devices, they cannot ensure the complete protection of vehicles against theft and the recent improvement cannot make it any better. It will be apparent that the prior art device is inconvenient and rather unreliable.

SUMMARY OF THE INVENTION

It is an object of the invention to provide an antitheft locking device that can ensure a reliable protection of a vehicle against theft while being simple and compact in structure.

Another object of the invention is to provide a antitheft locking device that is protected against tampering.

Still another object of the invention is provide an antitheft locking device that is easy to install and lock.

Further object of the invention is to provide an antitheft locking device that is compact in storage.

With these another objects in view, an antitheft locking device according to the invention has a steering wheel engaging member with an end wall configured and dimensioned to cover the steering wheel over its part that includes at least two ribs, a peripheral wall configured and dimensioned to extend over at least a part of the outer periphery of the rim of the steering wheel to which the two ribs are connected, and at least two spaced stops engageable with the ribs and protruding from the end wall. A stop member attached to the steering wheel engaging member extends at an angle with respect to its end wall and is engageable with a fixed part of the vehicle. A locking mechanism has a lock made fast to the steering wheel engaging member and a locking member connected to the steering wheel engaging member for movement from an unlocked position to a locked position in which the locking member and the steering wheel engaging member fully enclose the rim of the steering wheel.

These and other objects and advantages of the invention will become apparent from the following detailed description of its embodiments and operation.

DESCRIPTION OF THE DRAWINGS

FIG. 4 is a view taken along arrow B in FIG. 3;

FIG. 5 is a sectional view taken along line V—V in FIG. 4;

FIG. 9 is a sectional view taken along line IX—IX in FIG. 8, a;

DESCRIPTION OF PREFERRED EMBODIMENTS

Figures 1, 2:
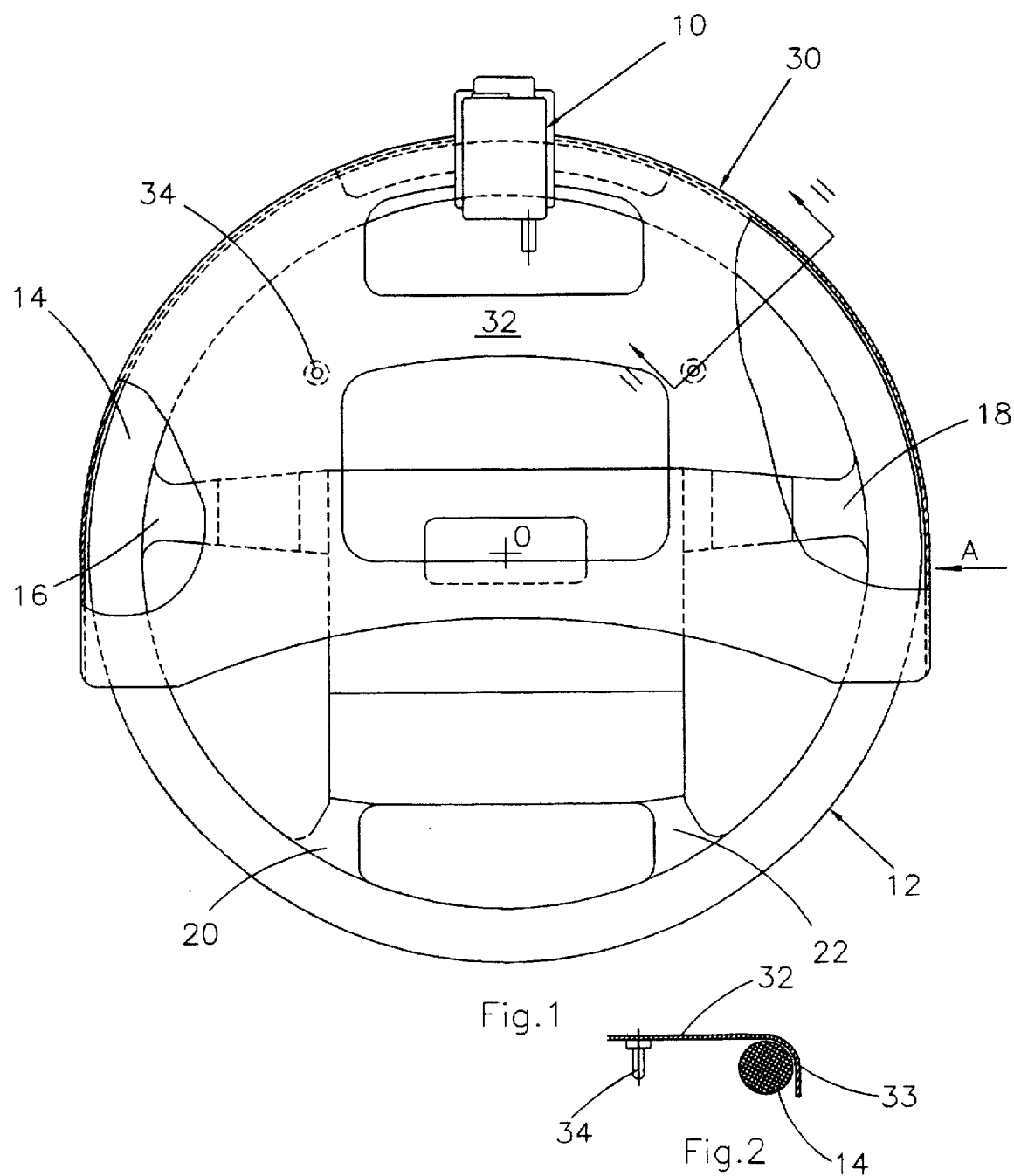
FIG. 1 is a front elevation view, partially in section, of an antitheft locking device for a vehicle according to the invention as installed on a steering wheel.
FIG. 2 is a sectional view taken along line II—II in FIG. 1.

With reference to FIG. 1, an antitheft locking device for a vehicle generally shown at 10 is installed on a steering wheel 12. The steering wheel has a rim 14 and a plurality of ribs 16 through 22 connected to rim 14 for turning a steer shaft (not shown) when steering wheel rim 14 is rotated about axis of rotation O—O (FIG. 2) shown at O in FIG. 1.

Figure 3:
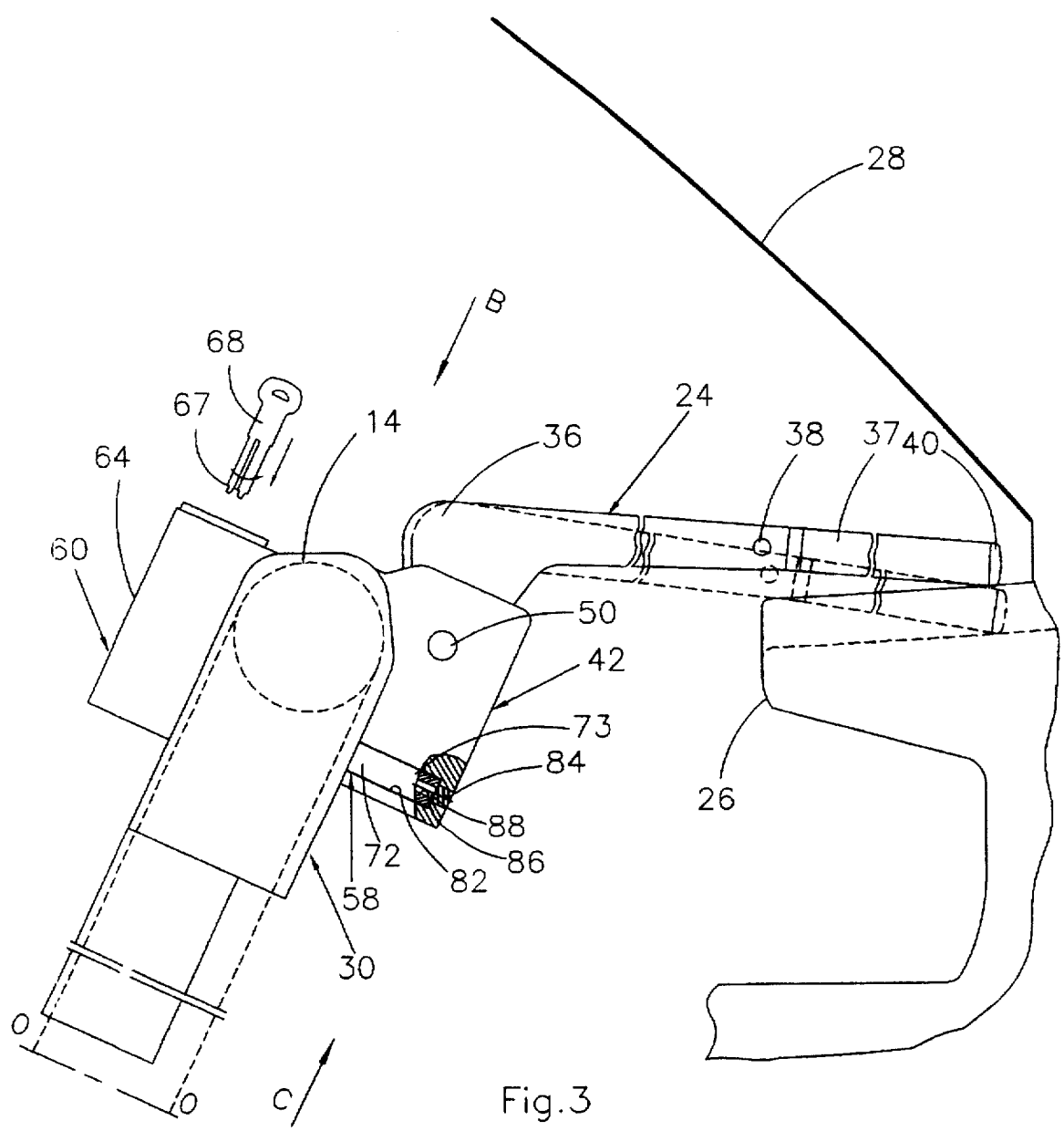
FIG. 3 is a view taken along arrow A in FIG. 1.

As shown in FIG. 3, the antitheft locking device has a stop member 24 engageable with a fixed part of the vehicle which in this example is a dashboard 26 located under a windshield 28. It is understood that other fixed parts of a vehicle can be engageable with stop member 24 that can be of any shape and size to fit a specific application.

Antitheft locking device 10 comprises a steering wheel engaging member 30 which is configured to embrace steering wheel 12 circumferentially and in the cross-section. As shown in FIG. 1, steering wheel engaging member has an end wall 32 configured and dimensioned to cover steering wheel 12 over a part that includes at least two ribs 16, 18. As shown in FIG. 1, end wall 32 is shaped as a segment of a circle and may have various cut-outs as shown for weight reduction and better cooling when the vehicles is left under direct sunlight. End wall 32 is connected to, or made integral with a peripheral wall 33 (FIG. 2) extending substantially perpendicularly with respect to end wall 32. The peripheral wall is configured and dimensioned to extend over at least a part of periphery of rim 14 to which ribs 16 and 18 are connected. The size of end wall 32 and curvature of peripheral wall 33 can be chosen to fit steering wheel sizes within a certain range. In other words, there may be two or three different sizes of steering wheel engaging member 30 can be provided to fit all steering wheel for existent vehicles. In this particular embodiment, steering wheel engaging member 30 covers the part of rim 14 to which ribs 16 and 18 are connected. It will be therefore apparent that steering wheel engaging member 30 completely covers the top part of rim 14 of steering wheel 12 and at least two ribs 16, 18 connected to that part of rim 14. It is understood that end wall 32 and peripheral wall 33 can extend over a greater part of steering wheel 12, but, as it will be apparent from the description given below, this is not absolutely necessary. With this construction of steering wheel engaging member 30 neither rim 14, nor ribs 16, 18 can be cut or otherwise broken or removed within a reasonably short period of time that a car thieve would usually have to tamper with the antitheft locking device.

As shown in FIGS. 1, 2, steering wheel engaging member 30 has at least two spaced stops 34 in the form of pin-like projections engageable with ribs 16, 18. Stops 34 protrude from end wall 32 as shown FIG. 2, in the same direction as peripheral wall 33. It will be apparent that in the event an attempt is made to turn steering wheel 12 with respect to engaging means, stops 34 will interfere with one of ribs 16 and 18 (depending on direction of rotation) and will not allow the steering wheel to turn. It will be apparent to those skilled in the art that stops 34 can be attached to end wall 32 in any appropriate known manner (by using welding, threaded joints or integral construction).

Figure 6:
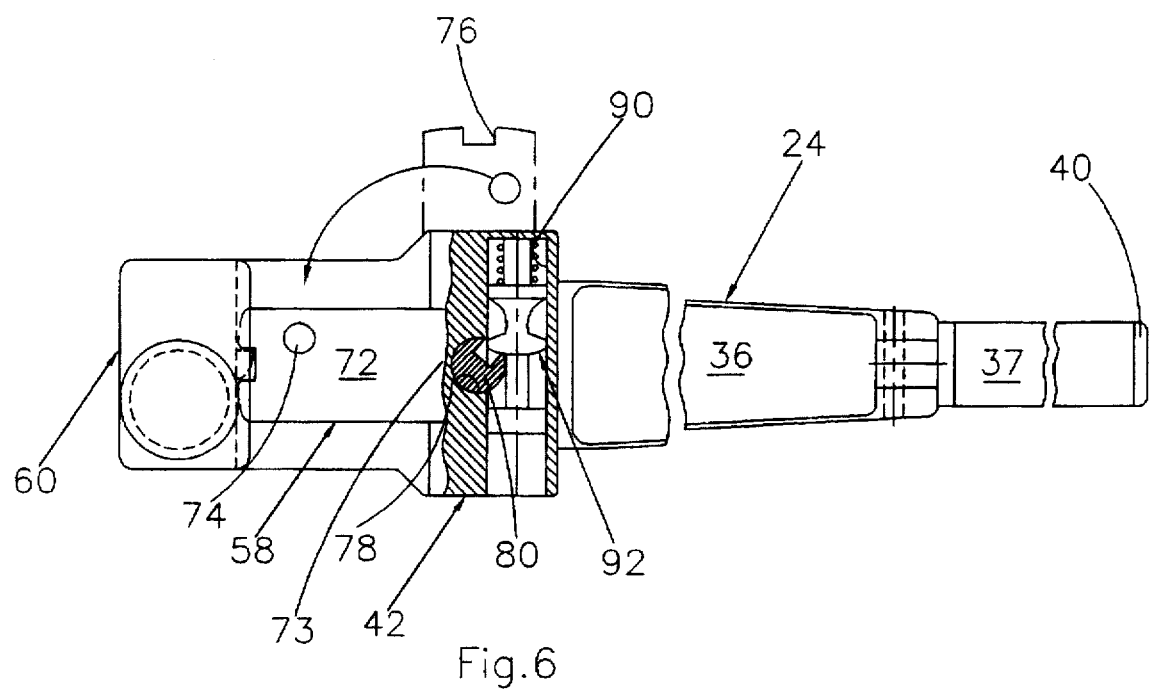
FIG. 6 is a view along arrow C in FIG. 3.

Stop member 24 engageable with dashboard 26 is connected to steering wheel engaging member 30 for rotation with steering wheel engaging member about axis of rotation O—O of steering wheel 12 (FIGS. 1 and 3-5). As shown in FIGS. 4-6, stop member 24 consists of an L-shaped lever 36 and an extension 37 pivoted at 38 to L-shaped lever 36 to facilitate selling packaging and storage in use. Extension 37 of L-shaped lever 36 has at its distal end a liner 40 of a plastic or other non-metal material to prevent damage to dashboard 26. Steering wheel engaging member 30 has a boss 42 (FIGS. 3-5) with a slot 44 having side walls 46, 48 (FIGS. 4, 5). Boss 42 is made integral with, or is otherwise made fast to steering wheel engaging member 30. A pin 50 is installed in opposite holes of side walls 46, 48. The centerline of pin 50 extends in a plane drawn substantially in parallel with the plane of end wall 32 of steering wheel engaging member 30. L-shaped lever 36 is mounted for rotation on pin 50. Thus L-shaped lever 36 (and stop member 24 in general) can be rotated in a plane extending transversely with respect to the plane of end wall 32 of steering wheel engaging member 30. L-shaped lever 36 can be rotated to a position in which it extends substantially in parallel with end wall 32 for folding the device for storage (not shown). This rotation is also necessary to adapt stop member 24 to diverse types and sizes of dashboard 26 in various types of vehicles. The rotation of stop member 24 about pin 50 is limited as described below. A proximal arm 35 of L-shaped lever 36 has a threaded hole 52, and an adjustment screw 54 is installed in the threaded hole. The protruding end of adjustment screw 54 has a portion 55 engageable with a wrench. Boss 42 of the steering wheel engaging member has a tapering face 56 within slot 44, and the protruding end of screw 54 engages this tapering face thus limiting rotation of stop member 24 counterclockwise. The amount of this rotation will depend on the amount of projection of adjustment screw 54 and can be changed to fit a specific type of dashboard 26. It is understood that when the device is not in use, extension 37 can be turned clockwise through 180° to be covered by the distal end of L-shaped lever 36, and the entire stop member 24 can be turned down (in FIG. 5) so as to take a small space in a selling package or during storage. At the same time, with this arrangement, stop member 24 is held fast for rotation with steering wheel engaging member 30 that is installed on rim 14 of steering wheel 12. It is understood that extension 37 may be made extendible by any appropriate known means (not shown).

The antitheft device according to the invention has a locking device 58 (FIG. 3-6) for locking steering wheel engaging member 30 in an engaged position with steering wheel 12. Locking device 58 has a lock 60 attached to steering wheel engaging member 30 and a locking means 62. Locking means 62 (FIG. 5) is connected to steering wheel engaging member 30 and cooperates with lock 60 so that locking means 62 and steering wheel engaging member 30 fully enclose rim 14 of steering wheel 12 in the cross-section.

As can be best seen in FIG. 5, there is a lock casing 64 made integral with, or otherwise connected in a non-detachable manner to steering wheel engaging member 30 and accommodates lock 60 which can be any appropriate known type to offer an adequate degree of protection. Lock 60 has a keyhole 66 for a key 68, an internal mechanism (to be disclosed below) operated by key 68, and a latch 70 operatively connected to the internal mechanism of the lock and mounted for movement between locking and unlocking positions. It is well known to those skilled in the art that diverse types of locks may be used here. As it is immaterial for this device how the lock is specifically constructed, it is not described in detail at this stage. Locking means 62 comprises a plate member 72 having a knob 74 for manipulation and a notch 76 at its distal end (FIG. 6) for receiving latch 70 of lock 60. Boss 42 has a hole 78, and a pivot shaft 80 is installed in this hole. Plate member 72 has a hole in its proximal end 73 (non-referenced) of a diameter corresponding to the diameter of pivot shaft 80, and pivot shaft 80 is received in the hole of plate member 72. As shown in FIGS. 3, 5, boss 42 has a slot 82 to receive plate member 72 and a small bore 84 communicating with slot 82. Plate member 72 has a bore 86 smaller than bore 84. When assembled, proximal end 73 of plate member 72 is first inserted into slot 82, and the hole of the plate member is put in alignment with hole 78 of boss 42. Pivot shaft 80 is inserted into hole 78 to pass through the hole of plate member 72. Bore 86 of plate member 72 is then put in alignment with bore 84, and a pin 88 (FIGS. 3, 5) is driven into bore 81 of plate member 72 to pass through a bore 81 of pivot shaft 80. It is understood that pin 88 must be longer than the diameter of pivot shaft 80.

Now plate member 72 can be turned from its first (unlocked) position to its second (locked) position in which its notch 76 receives latch 70 of lock 60. At the same time, plate member 72 cannot be removed from slot 82 of boss 42, and pivot shaft 80 cannot be removed from its hole. Bore 84 is plugged in any appropriate permanent manner to prevent pin 88 from being tampered. It will be apparent that when latch 70 of lock 60 is received in notch 76 of plate member 72 with lock 60 being locked (FIG. 6), and when plate member 72 and steering wheel engaging member 30 fully enclose rim 14 of steering wheel 12 in the cross-section (FIG. 5), steering wheel engaging means 30 cannot be removed from steering wheel 12 and can only be rotated with its rim 14 thanks to stops 34 (FIGS. 1, 2). This rotation is, however, prevented by engagement between stop member 24 and dashboard 26 of the vehicle (FIG. 3) because stop member 24 is held fast for rotation with steering wheel engaging member 30.

It is preferred that keyhole 66 (FIG. 4) face in the direction substantially radially outwardly with respect to the steering wheel. This means that key 68 has to be inserted at a point between keyhole 66 and windshield 28. This is quite easy with the true key. It will be apparent that it would be very difficult for a car thieve to manipulate with any kind of tools for tampering the lock within this very restricted and hard to get at space. This facility provides an additional degree of protection.

It will be apparent from the above description that the antitheft locking device according to the invention can be easily installed on rim 14 of steering wheel 12 by simply putting steering wheel engaging member 30 on top of rim 14 in a position shown in FIG. 1, with stop member 24 positioned as shown in FIG. 3. Plate member 72 is then turned by gripping knob 74 until latch 70 snaps into notch 76 of plate member 72. Thus it takes three simple steps to install the antitheft locking device in place: unfold and turn stop member 24 to its working position of FIG. 5, put the whole device on rim 14 of steering wheel 12, and turn plate member 72 into engagement with latch 70. The only difference may arise in connection with a specific type of lock used. Some locks may require that the key be turned to lock the latch and some may not.

When the antitheft locking device is put in place and locked as described above, any attempt made within a reasonably short time to make the vehicle drivable will fail because it is not possible to cut or break rim 14 and ribs 16, 18 that are covered by end wall 32 and peripheral wall 33 of steering wheel engaging member 30, and rim 14 cannot be turned relative to of steering wheel engaging member 30 because stops 34 would interfere with one of ribs 16, 18 (depending on direction of rotation). The entire device, hence steering wheel 2, cannot be turned because of engagement between stop member 24 and dashboard 26.

It is known that the majority of people would like their car to be ready for a ride as soon as possible. Besides, there are certain situations where it is highly desirable to start and ride immediately after opening the car door.

Figures 7A, 7B:
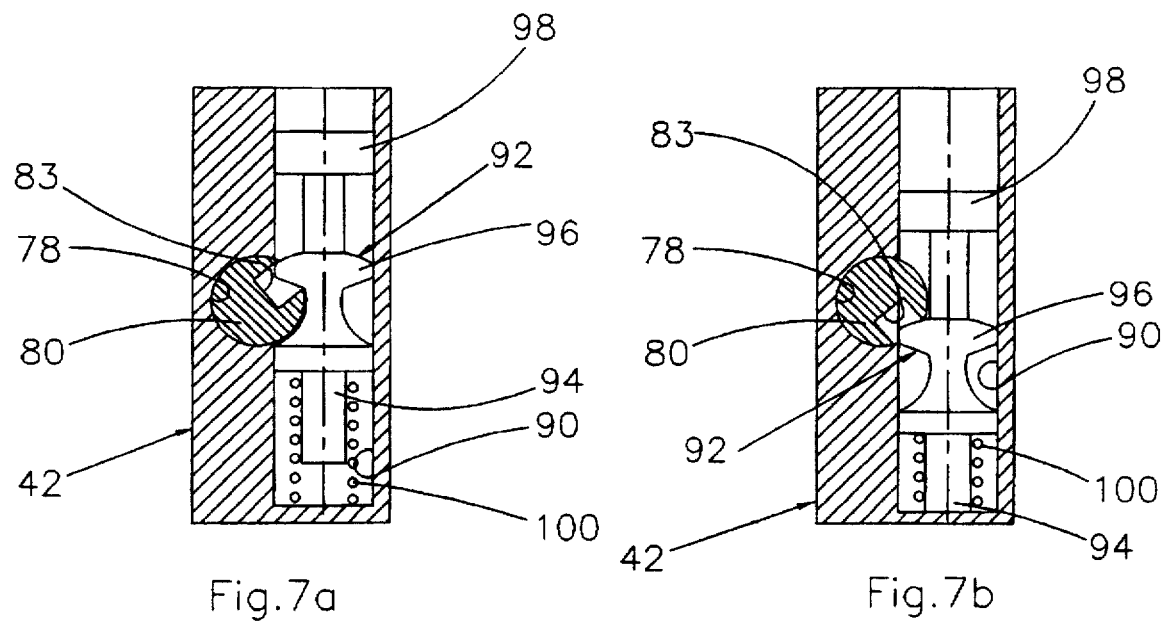
FIGS. 7, a, b are enlarged partial sectional views taken along line VII—VII in FIG. 5 to show two positions of a means for moving a plate member to an open position.

With the above in view, the device according to the invention can be further improved by having a means for moving plate member 72 to an open position after unlocking lock 60. As can be seen in FIGS. 6, and 7, a, b, boss 42 has a blind guide bore 90 at a proximal end 73 of plate member 72. Guide bore 90 intersects hole 78 in which pivot shaft 80 is received. Pivot shaft 80 has a longitudinal slot 83 in its periphery (FIGS. 7 a, b). According to the invention, there is provided a mechanism for moving plate member 72 to the first (unlocked position). This mechanism has a slide member 92 received in guide bore 90 for axial movement. Slide member 92 has a shank portion 94, an enlarged portion 96 and a guide portion 98 (FIGS. 7, a, b). The diameter of guide portion 98 corresponds to the inside diameter of guide bore 90, and enlarged portion 96 and shank portion 94 define a shoulder of a diameter corresponding to the inside diameter of guide bore 90 to insure a smooth movement of slide member 92 in guide bore 90. Enlarged portion 96 of slider 92 engages slot 83 of pivot shaft 80 in a manner to exert a camming action on the pivot shaft upon an axial movement of slider 92. A spring 100 is installed with a preload in the blind end of guide bore 90 and bears against enlarged portion 96 of slide member 92. When plate member 72 is in the open position shown with dotted lines in FIG. 6, pivot shaft 80 and slide member 92 are in a position shown in FIG. 7, a, and spring 100 is only preloaded. When plate member 72 is turned to the second or locked position to be locked by latch 70 of the lock, pivot shaft 80, which is connected to proximal end 73 of plate member 72 by means of pin 88, is caused to rotate. This rotation results in slide member 92 moving down in FIG. 7, a to compress spring 100. In the position shown in FIGS. 6 and 7, b (with plate member 72 in the locked position in which it is held by latch 70 of the lock) slide member 92 is under the action of compressed spring 100, and enlarged portion 96 of slide member 92 bears against slot 83 of pivot shaft 80. Slide member 92 cannot turn pivot shaft 80 because plate member 72 is locked by latch 70 of the lock. As soon as the lock is unlocked (as described below), latch 70 will no longer hold plate member 72 that is now free to move. Spring 100 is expanded to move slide member 92 axially in guide bore 90 (FIG. 7, b), and enlarged portion 96 of the slide member acts upon pivot shaft 80 to turn it to the position shown in FIG. 7, a. As a result of this rotation of pivot shaft 80, plate member 72 (connected to pivot shaft 80 by means of pin 88) also turns to the open position shown with dotted lines in FIG. 6. Thus it will be apparent that when lock is unlocked by means of a key or any other means (not explained in detail at this stage), plate member 72 will automatically move to the open position. As explained above, steering wheel engaging member 30 is held on rim 14 of steering wheel 12 only by means of plate member 72. This means that the car owner can remove the antitheft locking device according to the invention immediately after unlocking it without any other manipulations.

It is understood that the antitheft locking device described above can have a lock of any kind (mechanical, key-actuated lock, coded lock or even electrically or remotely controlled lock, etc.). The description that follows discloses a lock which is specifically designed for this antitheft locking device with the aim of enhancing its protective capabilities and facilitating its use.

Figure 10:
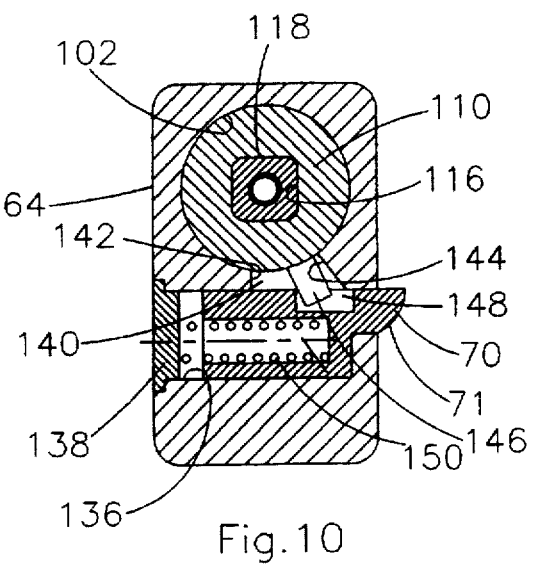
FIG. 10 is a sectional view taken along line X—X in FIG. 8, b showing the lock in the locked position.
Figure 8A:
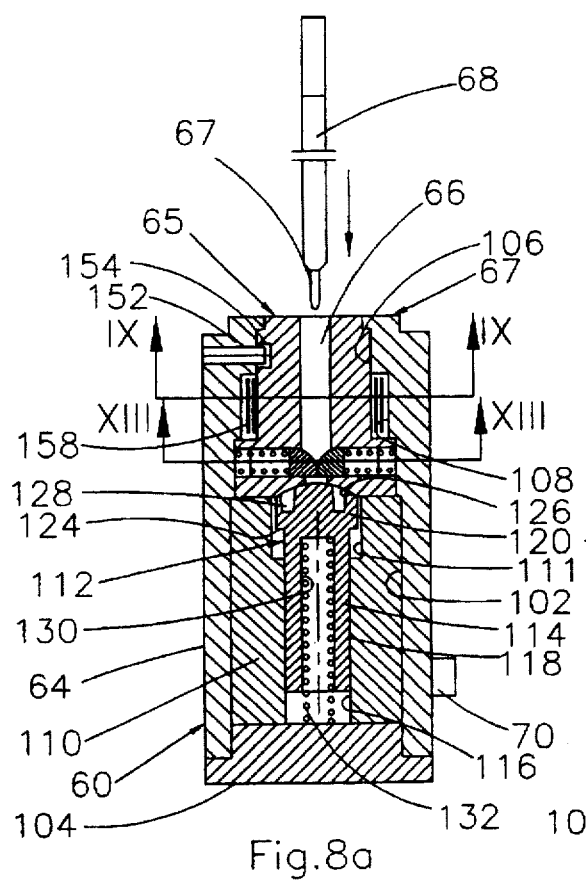
FIG. 8, a–c are enlarged longitudinal sectional views of a lock used in the antitheft locking device for a vehicle according to the invention.
Figure 8B:
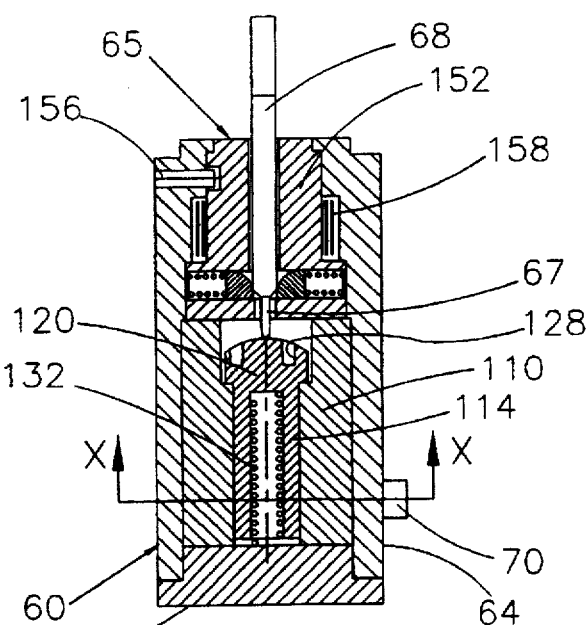
Figure 12:
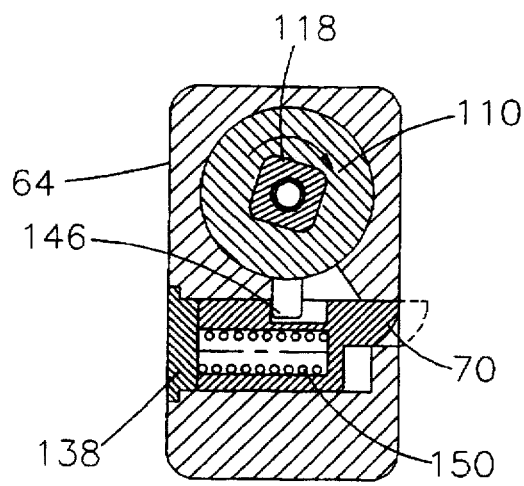
FIG. 12 is a sectional view of FIG. 10 showing the lock movement to the unlocked position.
Figure 8C:
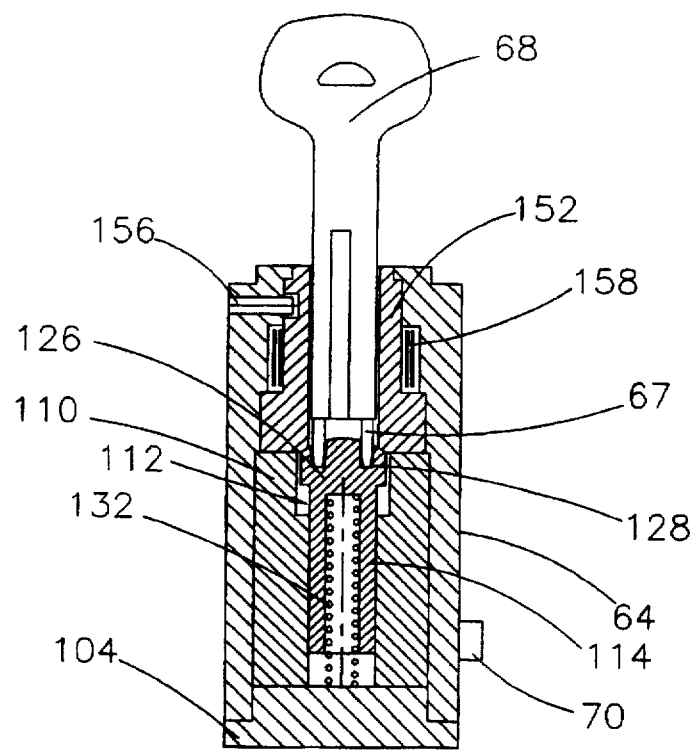
Figure 11:
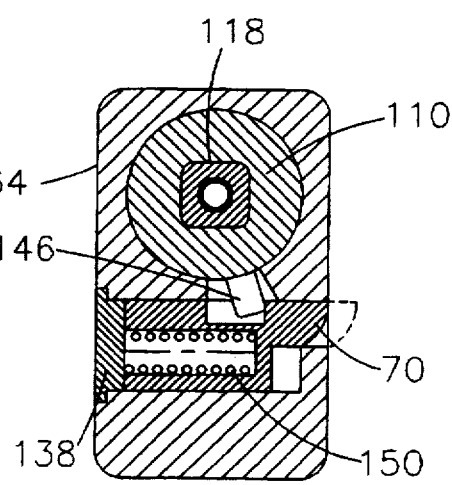
FIG. 11 is a view similar to that shown in FIG. 10, illustrating the position of lock parts when latch is moved into the lock casing by a locking member.

As shown in FIGS. 8, a, b, 9, and 10, lock 60 is accommodated in lock casing 64 having an exposed end 67. Lock casing 64 is located opposite to boss 42 in which pivot shaft 80 holding plate member 72 is installed for rotation (FIG. 5). As previously described, lock 60 has latch 70 for locking plate member 72 and keyhole 66 for insertion of key 68. Lock casing 64 has a bore 102 defining a space for a lock mechanism, an end wall 104 closing the space for a lock mechanism, a bore 106 at exposed end 67, and a counterbore 108 between bores 102 and 106. A lock mechanism comprises a movable member in the form of a rotatable member 110 mounted for rotation in bore 102 and a key stop 112 mounted in rotatable member 110. Key stop 112 comprises a shank 114 installed for axial movement in, and for combined rotation with rotatable member 110. For that purpose, rotatable member 110 has a non-round (e.g., square) through hole 116 (FIG. 10) and shank 114 has an identically shaped and dimensioned portion 118 (FIG. 8) that fits into through hole 116. With this construction key stop 112 can move axially in hole 116 of rotatable member 110, and rotatable member 110 would turn upon rotation of key stop 112 as will be described below. Rotatable member 110 also has a counterbore 111, and key stop 112 has a head portion 120. Head portion 120 of key stop 112 defines an annular shoulder 124 engageable with the bottom of counterbore 111 of rotatable member 110. Head portion 120 has a convex curvilinear end face, e.g., a spherical end face 126 and substantially axial key sockets 128. Key sockets 128 are dimensioned and located to fit dimensions and location of mating prongs 67 of key 68 in a manner well known to those skilled in the art. It will be apparent that form and relative position of prongs 67 and socket holes 128 are individually set up for each lock and key combination during manufacture to protect the lock against tampering. Lock 60 also has a protective means 65 that covers key sockets 128 against tampering and acts as a retainer holding key stop 112 against axial movement out of the lock casing. This protective means will be described in detail below. It is understood that such protective means offers an additional protection. Square portion 118 of shank 114 has a blind bore 130, and a spring 132 is mounted in this blind bore and bears against end plate 104 of lock casing 64. Spring 132 presses key stop 112 in the direction toward exposed end 67 of casing 64. Lock casing 64 has a slot 136 (FIG. 10) in which latch 70 is mounted for reciprocation in a plane drawn at right angles with respect to the axis of rotation of rotatable member 110. Slot 136 is plugged at 138 and communicates with bore 102 of lock casing through a groove 140 having opposite walls 142 and 144, and rotatable member 110 has a drive member 146 radially protruding from the rotatable member. Latch 70 has an axially extending groove 148 in its side facing toward rotatable member 110, and drive member 146 of rotatable member 110 is received in groove 148. Latch 70 has a blind axially extending hole (non-referenced), and a spring 150 is mounted in this hole and bears against plug 138. When latch 70 is installed into slot 136 of lock casing 64, spring 150 is compressed and retained in this position by means of plug 138. The trailing edge of axially extending groove 148 of latch 70 bears against drive member 146 of rotatable member 110 and presses this drive member against wall 144 of groove 140 of lock casing 64. Latch 70 is shown in FIG. 10 in the position in which its protrudes from the lock casing. In this position plate member 72 can be pressed against a beveled edge 71 of latch 70 to push latch 70 to the left in the drawing to a position shown in FIG. 11 and to compress spring 150. If plate member 72 is moved further, latch 70 is pushed back by spring 150 and is received in notch 76 of plate member 72 (FIG. 6). This is the locked position of plate member 72 that cannot be turned into an open position without retracting latch 70 into slot 136 of lock casing 64. In this locked position of the lock its parts will be in the position depicted in FIG. 8, a. To unlock, key 68 has to be pressed with its prongs 67 against spherical head 126 of key stop 112 and moved down to push key stop 112 all the way down and compress spring 132. This position is shown in FIG. 8, b. In this position key 68 is turned until its prongs 67 are brought in registry with socket holes 128 of spherical head 126 of key stop 112. At this point key stop 112 is free to move back under the action of spring 132. This position is shown in FIG. 8, c. Now, with prongs 67 of key 68 engaged in code sockets 128 of head 126 of key stop 112, key stop 112 can be turned by key 68 to rotate rotatable member 110 and to move drive member 146 to the left in FIG. 10 so as to cause latch 70 to retract into lock casing 64 (FIG. 12) and to disengage from notch 76 of plate member 72. When the key is withdrawn from the lock, spring 150 moves latch 70 back to the protruding position.

Figure 9:
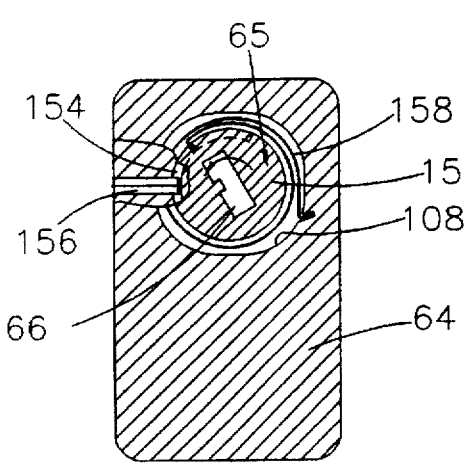

As shown in FIGS. 8, 9, lock 60 has lock protective means 65 comprising a rotatable block 152 that is mounted for a limited rotation in counterbore 108 of lock casing 64 and has keyhole 66 (FIGS. 8, a, 9). Rotatable block 152 is held against axial movement and protected against tampering by any appropriate known means. Rotatable block 152 completely covers spherical head 126 of key stop 112 and retains it in the axial direction. It is preferred that the outside diameter of rotatable block 152 be larger than the outside diameter of spherical head 120. Rotatable block 152 is mounted for a limited rotation in lock casing 64. This can be achieved, e.g., by cutting a groove 154 in the periphery of rotatable block 152 to extend over certain arc of circle of the periphery of the rotatable block (preferably, at least one quarter of a circle) and by providing a stop pin 156 of lock casing 64 protruding into groove 154 (FIGS. 8, 9). It is understood that rotation of rotatable block 152 in lock casing 64 can be limited by many other means well known to those skilled in the art. A torsion spring 158 is mounted in counterbore 108 around rotatable block 152 and has its ends fixed to rotatable block 152 and to lock casing 64, respectively, to hold rotatable block 152 in a preset position in lock casing 64. This position is set up during assembly and must be such that keyhole 66 should be oriented so as not to uncover code sockets 128 of key stop 112. This facility provides an additional protection against tampering. When key 68 is inserted into keyhole 66, pressed against spherical head 126 of key stop 112 and then turned, rotatable block 152 will also turn and arm torsion spring 158. The lock is then unlocked as described above.

Torsion spring 158 has two functions which makes the lock different from other locks having a similar protective feature. The first function is to hold rotatable block 152 in its working position in which keyhole 66 is oriented in an offset position with respect to code sockets 128 of key stop 112. The second function allows the lock to have the self-unlocking feature. If the force of torsion spring 158 is greater than the force of spring 150 that holds the latch in the protruding (locked position), latch 70 can be retracted into lock casing 64 without positively turning rotatable member 110. When the parts of the lock are in the position shown in FIG. 8, c and key 68 is released from grip (by simply easing the hold of the key), torsion spring 158 uncoils to turn rotatable block 152 clockwise back to its initial position. As key 68 turns with rotatable block 152 it causes rotation of key stop 112, hence of rotatable member 110, whereby drive member 146 acting upon latch 70 retracts the latch into the lock casing to move it out of engagement with notch 76 of plate member 72. If this embodiment is used in combination with the above-described means for moving plate member 72 to the open position, the device will be ready for removal substantially immediately after the key, having its prongs engaged in the code sockets, has been released from grip by simply easing the hold of the key.

Figure 13:
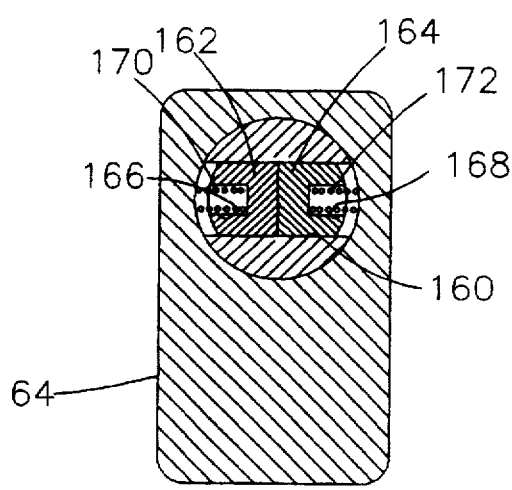
FIG. 13 is a sectional view taken along line XIII—XIII in FIG. 8 b showing the shutter members before insertion of a key.

As shown in FIGS. 8 a, b, 13, rotatable block 152 has a diametrical hole 160 (FIG. 13), and a pair of shutters 162, 164 are slidingly received in this hole 160 and have chamfers facing toward exposed end 67 of casing 64. As shown in FIG. 13 shutters 162, 164 have bores 166, 168, and preloaded springs 170, 172 are mounted in these bores. Shutters 162, 164 are inserted into hole 160 before putting rotatable block 152 into casing 64. Springs 170, 172 are then inserted into holes 166, 168 and compressed before insertion of rotatable block 152 into casing 64. Shutters 162, 164 provide additional protection against tampering and obstruct code sockets 128 of key stop 112. Moreover, the shutters demand an additional force to be applied by a tampering tool to clear the way for any other tampering device that might be inserted through keyhole 66 of rotatable block 152. It will be apparent than one shutter can also perform this function.

Figure 14:
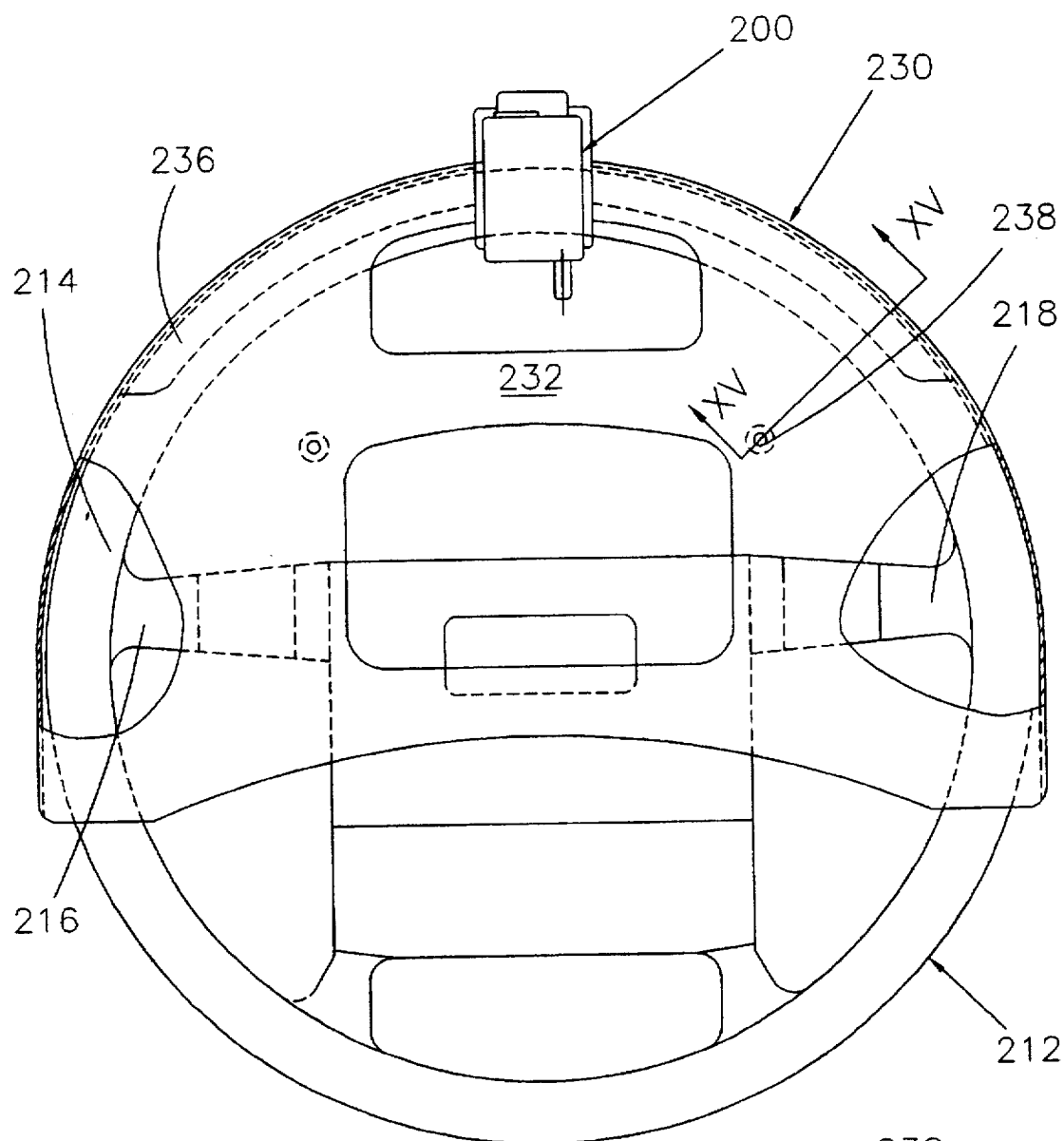
FIG. 14 is the device similar to that shown in FIG. 1 illustrating another embodiment of a steering wheel engaging member.
Figure 15:
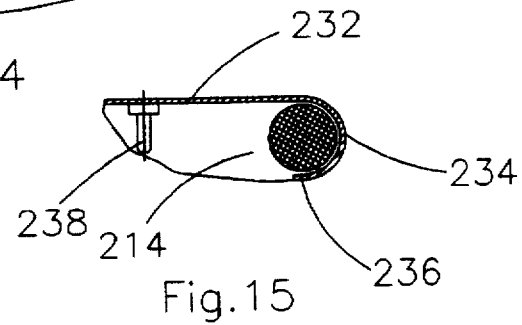
FIG. 15 is a sectional view taken along line XV—XV in FIG. 14.

The embodiment of the device according to the invention shown in FIG. 14 is similar to the above described embodiment in all respects but one. The difference is that peripheral wall 234 has a flange 236 extending substantially in parallel with end wall 232 of steering wheel engaging means 230 (FIG. 14). For installation of this device on steering wheel 212, the part of steering wheel engaging member 230 that has flange 236 is put in an offset position with respect to the steering wheel, with end wall 232 extending in parallel with the plane of the steering wheel. It should be noted that stops 238 should be positioned somewhere between rim 214 and ribs 216 and 218. With the device in this position, end wall 232 is than pushed against the steering wheel. The device is then moved down in parallel with the steering wheel, until its peripheral wall 234 with flange 236 is seated against rim 212 to engage it completely. The provision of flange 236 offers an additional degree of protection.

It will be apparent from the above description that the antitheft locking device according to the invention ensures a simple use and provides a reliable protection against tampering.

I claim:

1. An antitheft locking device for a vehicle having an interior comprising a fixed part of said interior and a steering wheel having an axis of rotation, a rim having a periphery and defining a diametrical plane and a plurality of rims connected to said rim, said antitheft locking device comprising:

a steering wheel engaging member comprising an end wall extending substantially in parallel with said diametrical plane, said end wall adopted to be configured and dimensioned to cover said steering wheel over a part thereof that includes at least two of said ribs, a peripheral wall adopted to be configured and dimensioned to extend over at least a part of the outer periphery of said rim to which said at least two ribs are connected, and at least two spaced stops engageable with said ribs, said stops protruding from said end wall;

an L-shaped stop member extending at an angle with respect to said diametrical plane in a plane drawn substantially at right angle with respect to said diametrical plane and engageable with said fixed part of said interior, said stop member having a proximal arm connected to said steering wheel engaging member for rotation therewith about said axis of rotation of said steering wheel;

an adjusting means between said proximal arm of said L-shaped stop member and said steering wheel engaging member for changing the position of said L-shaped stop member with respect to said fixed part of said interior, said adjusting means comprising a threaded bore in said proximal arm of said L-shaped stop member and an adjustment screw installed in said threaded bore, said steering wheel engaging member having a tapering face located opposite to said proximal arm of said L-shaped member;

a locking means for locking said steering wheel engaging member in a position in which it cannot be removed from said steering wheel, said locking means comprising:

a locking member;

a lock having a casing rigidly secured to said steering wheel engaging member and a latch member;

said locking member comprising a plate member having a proximal end and a distal end, said proximal end being connected to said steering wheel engaging member for rotation between a first position and a second position; and said distal end of said locking member being engageable with said latch member in said second position and said locking member being disengaged from said latch member in said second position.

2. The antitheft locking device of claim 1, wherein said lock is a key-actuated lock having a keyhole, said keyhole facing in a direction substantially radially outwardly with respect to said peripheral wall of said steering wheel engaging member.

3. The antitheft locking device of claim 1, wherein said locking means further comprises a means engageable with said proximal end of said plate member for moving said plate member to said first position when said lock is unlocked with a key.

4. The antitheft locking device of claim 3, wherein said lock is a key-actuated lock having a keyhole, said keyhole facing in a direction substantially radially outwardly with respect to said peripheral wall of said steering wheel engaging member.

5. The antitheft locking device of claim 3, wherein said means for moving said plate member to said first position comprises:

a pivot shaft of said plate member connected to said proximal end of said plate member for rotation therewith, said steering wheel engaging member having a hole, said pivot shaft being rotatably received in said hole of said steering wheel engaging member, said pivot shaft having a periphery and a slot in said periphery extending over a part of length of said pivot shaft;

a guide bore in said steering wheel engaging member intersecting said hole, said slot being located in said guide bore;

a slide member slidingly received in said guide bore and having an enlarged section received in said slot of said pivot shaft; and a spring installed in said guide bore, one end of said spring bearing against said steering wheel engaging member and the other end of said spring bearing against said slide member, whereby said spring, that is compressed when said plate member is moved to said second position, is expanded upon unlocking said lock to rotate said pivot shaft through the intermediary of said slide member and to move said plate member to said first position.

6. The antitheft locking device of claim 4, wherein said means for moving said plate member to said first position comprises:

a pivot shaft of said plate member connected to said proximal end of said plate member for rotation therewith, said steering wheel engaging member having a hole, said pivot shaft being rotatably received in said hole of said steering wheel engaging member, said pivot shaft having a periphery and a slot in said periphery extending over a part of length of said pivot shaft;

a guide bore in said steering wheel engaging member intersecting said hole, said slot being located in said guide bore;

a slide member slidingly received in said guide bore and having an enlarged section received in said slot of said pivot shaft; and a spring installed in said guide bore, one end of said spring bearing against said steering wheel engaging member and the other end of said spring bearing against said slide member, whereby said spring, that is compressed when said plate member is moved to said second position, is expanded upon unlocking said lock to rotate said pivot shaft through the intermediary of said slide member and to move said plate member to said first position.

7. An antitheft locking device for a vehicle having an interior comprising a fixed part of said interior and a steering wheel having an axis of rotation, a rim having a periphery and defining a diametrical plane and a plurality of rims connected to said rim, said antitheft locking device comprising:

a steering wheel engaging member comprising an end wall extending substantially in parallel with said diametrical plane, said end wall adopted to be configured and dimensioned to cover said steering wheel over a part thereof that includes at least two of said ribs, a peripheral wall adopted to be configured and dimensioned to extend over at least a part of the outer periphery of said rim to which said at least two ribs are connected, and at least two spaced stops engageable with said ribs, said stops protruding from said end wall;

an L-shaped stop member extending at an angle with respect to said diametrical plane in a plane drawn substantially at right angle with respect to said diametrical plane and engageable with said fixed part of said interior, said stop member having a proximal arm connected To said steering wheel engaging member for rotation therewith about said axis of rotation of said steering wheel;

an adjusting means between said proximal arm of said L-shaped stop member and said steering wheel engaging member for changing the position of said L-shaped stop member with respect to said fixed part of said interior;

a locking means for locking said steering wheel engaging member in a position in which it cannot be removed from said steering wheel, said locking means comprising:

a locking member attached to said steering wheel engaging means;

a casing having an exposed opening;

a rotatable member mounted for a limited rotation in said casing and having an end facing toward said exposed end of said casing and an axis of rotation;

a latch member operatively connected to said rotatable member for reciprocation in said casing between the locked and unlocked positions when said rotatable member is turned, said latch member being engageable with said locking member of said steering wheel engaging means;

a key stop having an end facing toward said exposed opening, that defines, together with said end of said rotatable member facing toward said exposed end of said casing, a dead-end wall of said casing, said key stop being mounted for axial reciprocation in, and for combined rotation with, said rotatable member and having in said end facing toward said exposed opening at least one code socket offset with respect to said axis of rotation;

a rotatable spring-loaded block mounted between said exposed opening of said casing and said end of said key stop, said block being held in said casing against axial movement and having a substantially diametrical key slot angularly offset with respect to said at least one code socket; and a spring between said key stop and said rotatable member, said spring axially pressing said key stop against said rotatable spring-loaded block.

8. The antitheft locking device of claim 7, wherein said key stop is convex.

9. The antitheft locking device or claim 7, wherein said rotatable block has at least one spring-loaded shutter positioned between said exposed end of said casing and said end of said key stop defining said dead end wall.

10. The antitheft locking device of claim 9, wherein said key stop is convex.

* * * * *